United States Patent [19]

Lilly

[11] 4,416,331
[45] Nov. 22, 1983

[54] BIMETALLIC WELL SCREEN FOR USE IN INJECTION WELLS AND METHOD OF MAKING SAME

[75] Inventor: James A. Lilly, Minneapolis, Minn.

[73] Assignee: UOP Inc., Des Plaines, Ill.

[21] Appl. No.: 347,829

[22] Filed: Feb. 11, 1982

[51] Int. Cl.³ .............................................. E21B 43/08
[52] U.S. Cl. .................................... 166/236; 166/278; 29/434; 29/447
[58] Field of Search ............................. 166/231–236, 166/278; 29/447, 443, 163.5 CW

[56] References Cited

U.S. PATENT DOCUMENTS

| | | | |
|---|---|---|---|
| 1,570,725 | 1/1926 | Benckenstein | 166/235 |
| 1,780,882 | 11/1930 | Kettler | 166/236 |
| 2,046,458 | 7/1936 | Johnson | 166/8 |
| 2,150,450 | 3/1939 | Maloney | 166/235 |
| 2,787,956 | 4/1957 | Kirby et al. | 29/447 |
| 4,167,972 | 9/1979 | Sears | 166/233 |

Primary Examiner—Ernest R. Purser
Assistant Examiner—Thuy M. Bui
Attorney, Agent, or Firm—James R. Hoatson, Jr.; Barry L. Clark; William H. Page, II

[57] ABSTRACT

Mounting arrangement for a bimetallic pipe base well screen which must operate at elevated temperatures includes a pair of expandable end boss rings at the ends of a cylindrical screen member. The end boss rings overlie unperforated portions of the outer surface end portions of an internal pipe member which has perforations along a portion of its length which underlie the well screen. The screen member and the end boss rings have a greater temperature coefficient of expansion than the pipe base. At room temperature, the end boss rings have a smaller inner diameter than the outer diameter of the pipe base. The boss ring portions are heated and shrunk-fit onto the pipe base to a degree that at operational temperatures they will either expand slightly out of contact with the pipe base, or at least become substantially unstressed, thus preventing damage to the screen member while also blocking out the entry of particles. The arrangement is particularly useful where many screen sections are used in a string since the screen members can remain fixed in position in a gravel packed well while the pipe base sections can move up and down inside them in response to temperature variations.

8 Claims, 5 Drawing Figures

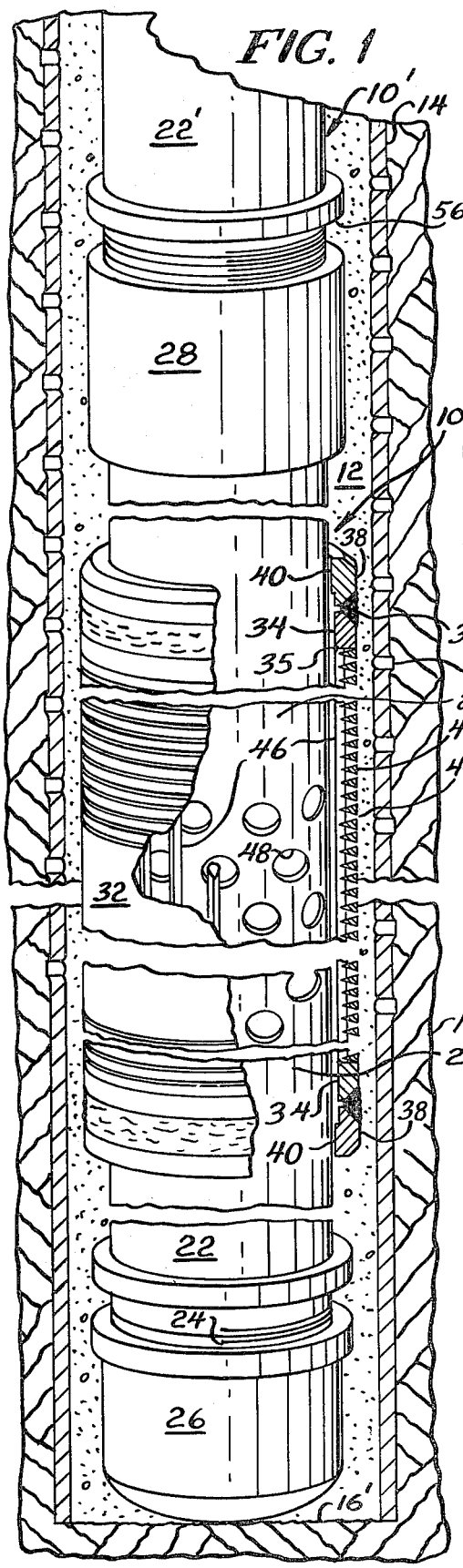
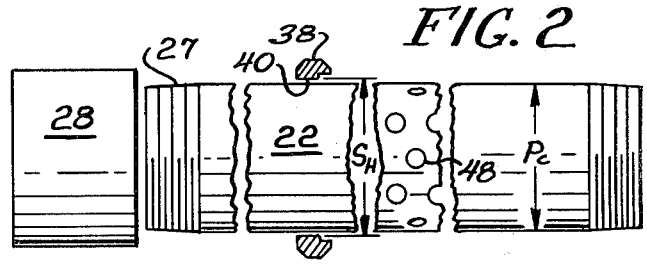
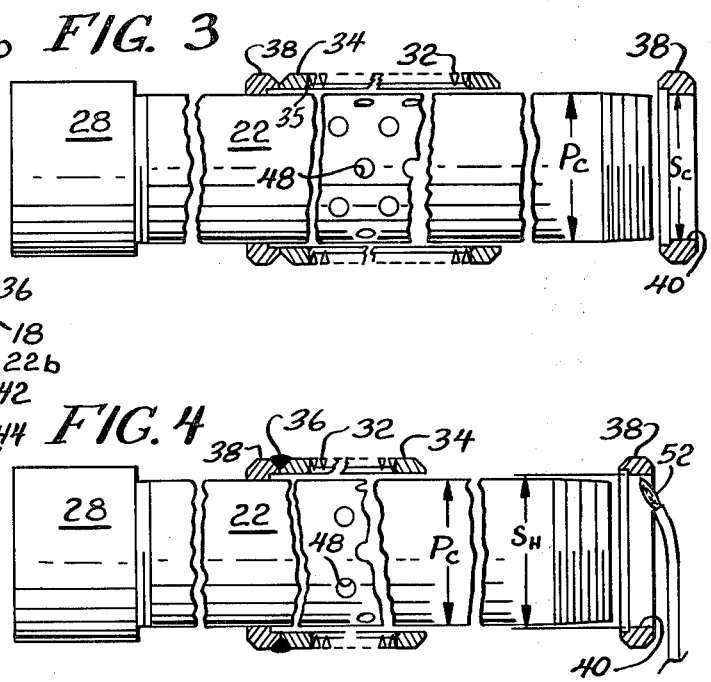
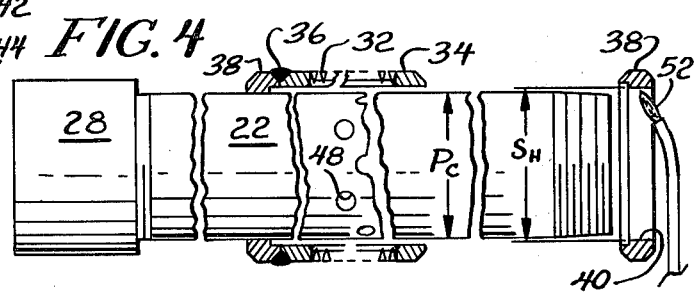
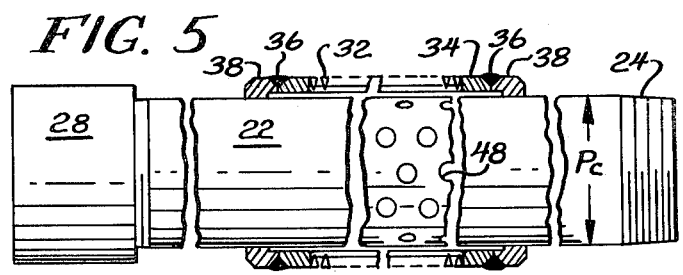

BIMETALLIC WELL SCREEN FOR USE IN INJECTION WELLS AND METHOD OF MAKING SAME

BACKGROUND OF THE INVENTION

The invention relates to well screens and particularly to well screens having a perforated pipe base of the type commonly used in the production of oil and gas. For many years, spiral wound well screens of the type disclosed in Johnson U.S. Pat. No. 2,046,458 have been used in water wells for permitting the passage of water through the surface of the screen and into a pipe connected at the upper end thereof which carries the water to the surface. Wells for the production of water are generally of much shallower depths than those used for the production of oil and gas and there is usually very little cause to withdraw the well pipe and the attached screen once the well is completed. The situation is far different in the production of oil and gas since such wells often extend many miles below the surface of the earth. The greater depth of the wells requires that the well screens and pipes have a much greater resistance to compressive, tensile and torsional loading than is the case with water wells. It has been found that the necessary strength to resist such loading can be provided for a well screen by mounting a screen jacket member on a perforated pipe base support member. An example of such an assembly is shown in my co-pending application Ser. No. 258,360 filed Apr. 28, 1981, now U.S. Pat. No. 4,378,840 in which one end of the screen jacket is welded to the pipe base while the other end is free to move at the high temperatures present in an injection well so as to prevent damage from differential expansion of the members. When the pipe and screen jackets are used in injection wells, it is generally necessary to remove them from the well after about 6–36 months of service to replace the gravel pack which deteriorates rapidly under the punishment it receives in the alternating cycles of injecting steam and removing oil, with the temperature changing continually.

A well screen assembly which has the upper end of the screen welded to the pipe base and the lower end free, but sealed relative to the pipe base with an elastomeric ring is disclosed in Sears U.S. Pat. No. 4,167,972 assigned to a common assignee. Such a screen would preserve the integrity of the screen jacket as compared to a jacket welded at each end in a situation where the pipe base is subjected to large tensile loads during its removal from a well. However, where the sealing means comprises an elastomeric ring, the seal can deteriorate very rapidly at temperatures over about 500° F., and thus would be of little value in an injection well experiencing higher temperatures. The cost of an elastomeric ring and associated construction and labor costs are also quite high.

Reference has been made to the problems which can arise when a screen is heated. Such a situation arises when advanced recovery techniques are used such as in steam injection of oil formations. These techniques are increasingly being employed in oil production in order to lower the viscosity of residual oils. Where the screen is welded to the base pipe at each end, the stresses produced in the screen would be compressive due to the increased thermal expansion of the stainless steel screen compared to that of the low carbon steel base pipe. This expansion could lead to failure of the screen by localized buckling. One primary effect of this would be opening of the screen slots causing sand to be pumped. A second primary effect would be to increase the chance that the screen wires or rods would separate and interfere with the ability to retrieve the screen. Presently used steam injection temperatures run from about 500°–650° F. At a temperature of 650° F., the differential expansion of a stainless steel screen relative to a low carbon steel pipe base is about 0.22" per 10' length. Since a single screen is typically from 20–40' long, a differential expansion of about 0.44–0.88" would be expected in going from room temperature to 650° F. In the "huff and puff" cycle type of injection operation, steam is injected for perhaps a month to heat the formation to 500°–650° F. and then oil is pumped for several months until its viscosity becomes too high as it cools to perhaps 300° F. This constant cycling between 300° F. and 650° F. would subject a stainless steel screen, which was welded at both ends to a low carbon steel base, to very substantial compression forces which would tend to cause it to buckle.

In order to provide a sufficient amount of screen openings in a given formation, it is common to provide hundreds of feet of screen length by joining together a large number of 10'–40' screen sections. This produces yet another problem when the well has relatively high down-hole temperatures. For example, where a well contains 5000 feet of carbon steel pipe and 320 feet of screen and operates at 650° F., it can be expected that the portion of the pipe supporting the topmost screen section will elongate as much as 14" relative to the portion of the pipe supporting the bottom section. Since the well is usually packed with gravel before it is made operational, it is easy to see that if the screen jacket segments were fixed at either or both ends to the pipe base, the gravel surrounding the pipe could exert a tremendous shearing force on the screen jacket segments, possibly shearing them free from the pipe base support as the pipe and screens moved during heating. It is further obvious that even if the segments were not sheared off, they would constantly abrade and destroy the gravel pack as they move up and down next to it upon cycling of the temperature. This abrasive action can result in a need to remove the well string and replace the gravel pack, and usually the screen jackets, much sooner than if relative movement between the gravel pack and screen jackets did not take place. One possible solution to preventing such relative movement is to pin the screen jacket to the pipe and provide packings or an elastomeric O-ring as a seal between the ends of the jacket and pipe. The pin would serve to hold the parts together during assembly of the screen into the well but, to permit relative movement when the well is operational, must then either be somehow removed after assembly or made of a material which will shear. The shearing of the pin would be caused by the upward expansion of the pipe when it is heated since the friction exerted on the screen jacket by the gravel pack would tend to prevent corresponding movement of the screen jacket. This shear pin type of connection would not prevent relative rotary motion between the screen jacket and pipe base and could thus hamper future recovery operations. For example, in recovery operations, an annular rotary cutter is usually lowered around the outside of the screen jacket to cut through the metal screen "centralizers" which are usually fixedly positioned at spaced location along the length of the screens. The centralizers have radially extending fins which are used for centering the screen in the casing as the gravel pack is inserted, but the fins must be cut before the screens can be removed. The cutting by the rotary cutter is quite simple when the screen cannot rotate but where the screen can rotate, the cutter would tend to dig into the centralizer fins and cause them to rotate the screen, thus preventing the relative movement required for cutting to take place. The use of packings or elastomeric O-rings which have to continually slide over the pipe base also presents problems since the packing material can be blown out of its intended location while the O-rings can rapidly deteriorate at high temperatures.

SUMMARY OF THE INVENTION

It is among the objects of the present invention to provide an improved bimetallic well screen assembly and a method of assembling same which will overcome the aforesaid sealing, wear and recovery problems of prior art developments. It is a further object to provide a pipe based well screen assembly which is simple to manufacture, which requires no external seals, which has the screen jacket firmly anchored to the base pipe during installation or removal from a well, and which allows the pipe base to move freely relative to the screen jacket(s) at elevated operational temperatures without any danger that the pipe base perforations will become uncovered.

These and other objects are achieved by the well screen and method of the present invention in which a section of spiral wrapped well screen is mounted to an underlying perforated pipe base member by means of a pair of cylindrical end boss rings which are each welded to an adjacent attachment ring. The boss rings are positioned at room temperature in a "shrinkfit" relation with an unperforated section of the pipe base member. The rings and well screen comprise a screen jacket assembly and are preferably made of stainless steel, while the pipe base is preferably of a low carbon steel material which has a temperature coefficient of expansion substantially less than the stainless steel. The boss rings are preferably, at room temperatures, of a sufficiently smaller inside diameter than the outer diameter of the portion of the pipe base which they are to overlie, that they will firmly engage the pipe base and rigidify the assembly during installation in a well. The degree of overlap should not be so great as to permit the rods in the screen to exceed about 75%, and preferably not more than about 25% of their yeild stress as they tend to elongate before the shrink fit rings release as they are heated in the well. Conversely, the radial gap between the screen and base pipe should, at the highest expected temperature, not exceed the width of the slots in the screen. Preferably, the gap should be much smaller, such as about 25% of the slot width, so as to minimize the chance that a particle would be able to lodge in the gap.

BRIEF DESCRIPTION OF THE DRAWINGS

FIG. 1 is a partially sectioned, partially broken away perspective view of a well screen assembly showing the relationship between it and the oil bearing formation in which it is positioned; and FIGS. 2-5 are partially sectioned, partially broken away side views showing the base pipe end coupling, screen member and boss rings during the successive stages of assembly of the screen jacket to the base pipe.

DETAILED DESCRIPTION OF THE PREFERRED EMBODIMENT

Referring to FIG. 1, the improved well screen assembly is indicated generally at 10, and is shown in a typical use environment within a steam injection well wherein temperatures of 500°-650° F. are commonly maintained. The assembly is shown as being surrounded by a gravel pack 12 and positioned within a metal well casing 14 which has been lowered to the bottom surface 16' of an oil-bearing formation 16. The casing 14 is typically perforated as shown at 18 by a perforating tool (not shown) which is lowered into the casing. The assembly 10 includes a pipe-type support base 22 which is typically made of low carbon steel for purposes of strength and economy. The lower end of the pipe base is threaded as shown in 24 and may be closed off such as by a bull plug 26. An upper threaded end portion 27 (FIG. 2) is adapted to be joined by a coupling 28 to a pipe string (not shown) or to the pipe base 22' of a second screen assembly section 10'. The screen member 32 is mounted on the pipe base 22 and has end portions comprising intermediate attachment rings 34 attached by welds 35, 36 respectively to the screen 32 and to end boss rings 38. The end boss rings 38 have an inner reduced diameter portion 40 which is generally slightly spaced from the pipe base when the screen assembly is at its elevated operating temperature and is in tight contact with the pipe base when the assembly is lowered into the well casing or removed from it at relatively cool temperatures. The reason that there is a gap between the inner reduced diameter end portion 40 and the pipe base 22 at high operating temperatures is that the well screen member 32 and its end rings 34, 38 are typically made of stainless steel which has a substantially higher temperature coefficient of expansion than the low carbon steel base pipe 22. The screen member 32 may be conventionally formed of a helically wound tapered wrap wire 42 which is wound and welded so as to form slots or spaces 44. The longitudinal support for the screen is provided by a series of longitudinal rod members 46 which are welded to the intermediate end rings 34 at 35 and also welded at each of their intersections with the wrap wire 42. The pipe base support member 22 is internally perforated t 48 in the region under the slots 44 so that fluids collected from the formation 16 can be passed upwardly through the support pipe 22 to the surface. The internal perforations must terminate a considerable distance from the boss rings 38 for reasons hereafter explained.

The improved method of assembling the well screen member 32 to the pipe base 22 is illustrated in sequential manner in FIGS. 2 through 5. Referring to FIG. 2, one can see that the pipe base member 22 has an outer diameter at room temperature of a dimension $P_c$. The upper screen end boss ring 38 is illustrated in its heated condition wherein its inner diameter portion 40 has a dimension $S_H$ which is slightly larger than the dimension $P_c$. Prior to heating, the inner diameter of the inner ring portion 40 of the end boss ring 38 has a room temperature dimension $S_c$ illustrated in FIG. 3 which is smaller than the pipe dimension $P_c$ so that there would be interference if one tried to assemble the end boss ring 38 to the pipe base 22 without heating. The coupling member 28 is generally supplied with the pipe 22 but is preferably removed so that the heated ring 38 need only be slid over a short length of pipe before being allowed to cool at a predetermined location on the pipe base where it will of course shrink into contact with the pipe.

FIG. 3 illustrates the step of assembling the pre-welded screen of elements 34, 32, 34 into contact with the previously assembled boss ring 38. The screen elements and boss ring are then welded at 36 as shown at the left of FIG. 4.

In FIG. 4, the step of selectively heating the end boss rings 38, and especially the inner diameter portion 40 by a source of heat 52 is illustrated. The heating may be done in any convenient manner, such as by a torch as shown, or by means of induction heating or by a resistance heater wrapped around the ring 38, to name a few alternatives. When sufficient heat has been applied to increase the diameter of the inner ring portion 40 to a dimension $S_H$ which is greater than $P_c$, the source of heat is removed and the right boss ring 38 is immediately moved to the left to its desired final position relative to the pipe base 22 and in contact with ring 34. Once in its final position, the end boss ring 38 will shrink as it is cooled until its inner diameter equals the dimension $P_c$. Since a shrink fit connection will thus be provided between the pipe base 22 and the inner ring portion 40, the right end attachment ring 34 can at this point be welded as shown at 36 to the right end boss ring 38. The compression fit between each of the end boss rings 38 and the pipe base will increase the rigidity of the screen assembly 10 as it is lowered into the well. When steam is injected into the well to increase the temperature of the well screen, the end boss rings will, of course, again expand outwardly relatively to the pipe base 22 and, depending upon the operating temperature of the well and the difference between the dimensions $P_c$ and $S_c$, rings 38 will expand away from the pipe base 22 and produce a radial gap. As previously noted, the radial gap can be no greater than the slot width 44 and preferably only about 25% of this dimension.

As seen in FIG. 1, the pipe base perforations 48 which permit liquid passing through the screen to be drawn to the surface, are shown as being spaced at considerable distances from the ends 24, 27 of the pipe 22, thus defining smooth blank end portions $22_b$ over which the screen jacket can slide relative to the pipe base as the pipe base lengthens or shortens during heating and cooling. The length of the blank end portions $22_b$ must of course be sufficient to prevent any perforation 48 from ever becoming uncovered by the screen jacket since the dimension of the perforations is much larger than that of the screen slots 44. Since it is common to have a plurality of screen assemblies 10, 10' connected in series in a well, the minimum length of each of the blank end portions, assuming all screen assemblies are to be interchangeable, would be eual to the maximum elongation of the entire series of pipe base members over a distance equal to the distance between the bottom surface of the hole 16' on which the pipe rests and the upper end of the highest screen assembly 10' in the string. For the previously noted instance of 320' of well screen, the elongation at a maximum anticipated temperature of 650° F. would be about 14". Where successive sections of screen are joined without couplings by flush male and female connections, or where couplings are used which are very little larger in diameter than the dimension $P_c$, or where it is desired to provide positive limitation to the movement of the screen jacket assembly relative to the pipe base, a stop flange 56 can be welded to either or both of the pipe base blank end portions $22_b$ on each section 10.

In use, the screen segment 10 and as many additional segments 10' as are desired are lowered into the well casing 14 and then segments of plain pipe are extended to the surface. A gravel pack 12 is inserted around all the screen segments and sufficiently far above to allow for settling. The shrink fit of the screen jacket to the pipe base will maintain the jackets during installation. Steam is then injected into the well to heat the oil in the formation 16. The increase in temperature expands the pipe base and screen segments by different amounts so as to weaken the hold of the screen to the pipe base. Thus, the screen segments will tend to be frictionally retained in their original positions relative to the gravel pack while the pipe base segments will be free to move upwardly relative to them. In this manner, the gravel pack can remain in its original position rather than be abraded and destroyed by having the screen segments moving over it as they would if they were not free to float. When it is desired to repack the well or remove the screens, the well temperature is brought down so as to cause the screens to again engage the pipe base.

I claim as my invention:

1. A bimetallic well screen assembly for use in an injection well at elevated temperatures comprising a pipe base member having a perforated portion intermediate its ends and unperforated portions adjacent thereto, an integral well screen member having a slotted portion overlying said perforated portion and unslotted end ring portions at each of its ends overlying said unperforated portions, said slotted portion extending continuously between said end ring portions, said well screen member having a temperature coefficient of expansion which is greater than the temperature coefficient of expansion of the pipe base member, said end ring portions having a radially compressed shrink fit connection to the underlying pipe base member at atmospheric temperatures, but being either slightly out of contact with said pipe base member or at least substantially unstressed at elevated operational temperatures, any spacing between said other end ring and said pipe base member at said elevated operational temperatures being no greater than the maximum width of the slot openings in the slotted portion of the screen member.

2. A bimetallic well screen assembly in accordance with claim 1 wherein the amount of compression exerted by said end ring portions on said pipe base member is insufficient to permit said well screen member to be compressed beyond 80% of its yield strength as said well screen assembly is brought to any operating temperature up to about 700° F.

3. A bimetallic well screen assembly in accordance with claim 1 wherein each of said end ring portions is weldingly attached to said well screen member by means of an intermediate attachment ring which is welded to a end of the slotted portion of the well screen member, said attachment rings having a larger internal diameter than said end ring portions.

4. A bimetallic well screen assembly in accordance with claim 1 wherein said pipe base member is formed of low carbon steel and the screen member and its end ring portions are formed of stainless steel.

5. A bimetallic well screen assembly in accordance with claim 1 wherein an unperforated portion of said pipe base member extends under at least one end of said well screen member from the corresponding end ring portion by a dimension which is at least equal to the total amount of elongation of all of the pipe base members in a well pipe string which can take place between the bottom end of the pipe string and the upper end of the highest well screen member in the pipe string, said elongation of the pipe string being calculated at the highest temperature anticipated in the well as compared to the position assumed by the highest well screen in the well at the lowest temperature anticipated in the well.

6. The bimetallic well screen assembly in accordance with claim 5 wherein said dimension, at a temperature of about 650° F., is about 14″ for a low carbon steel well pipe string having its highest well screen located at about 320′ from the bottom of the well.

7. A method of assembly an elongated cylindrical well screen member to a cylindrical base pipe member so that the members will be integral with each other during placement into a deep well but slidable relative to each other when at least a portion of the well screen member is retained against axial movement by a gravel pack at the bottom of the well and when substantial changes in the temperature in the well causes thermal expansion or contraction of the base pipe sufficient to move said base pipe axially relative to said retained portion, said method comprising the steps of providing an integral well screen member and a pair of fitting rings adapted to be integrally attached to each end of said well screen member, said fitting rings each having a temperature coefficient of expansion which is greater than that of the base pipe member; providing each of said fitting rings with an internal diameter which, at ambient atmospheric temperature, is less than that of the outer diameter of the portion of the base pipe to which the well screen member is to be assembled; applying sufficient heat to each of said fitting rings when it is to be assembled to said base pipe to expand said ring to a size larger than said base pipe; moving each of said heated fitting rings when it is to be assembled to said base pipe along said base pipe to a predetermined mounting position, and allowing said heated fitting rings to cool and shrink into contact with said base pipe; said fitting rings each being internally sized and being formed of a material such that a well screen positioned between the rings and welded or otherwise attached to each of them will be firmly held in "shrink-fit" engagement with said base pipe during placement into a deep well but free to slide relative to said base pipe when the portion of the well which is in the vicinity of the well screen is retained by a gravel pack in the well and is heated to an elevated operational temperature.

8. A method in accordance with claim 7 wherein said fitting rings are heated and mounted to said base pipe separately, the first of said fitting rings being heated and then immediately moved inwardly of one end of the base pipe to its desired position where it shrinks into contact with the base pipe, said screen member then being welded at a first end to said first fitting ring after which the second of said fitting rings is heated and immediately moved against the second end of the screen member, said second fitting ring then being welded to said second end.

* * * * *